Sept. 15, 1936.  F. H. HARRISON ET AL  2,054,540
ASSEMBLY FIXTURE FOR MOWER BARS
Filed March 8, 1935  2 Sheets-Sheet 2
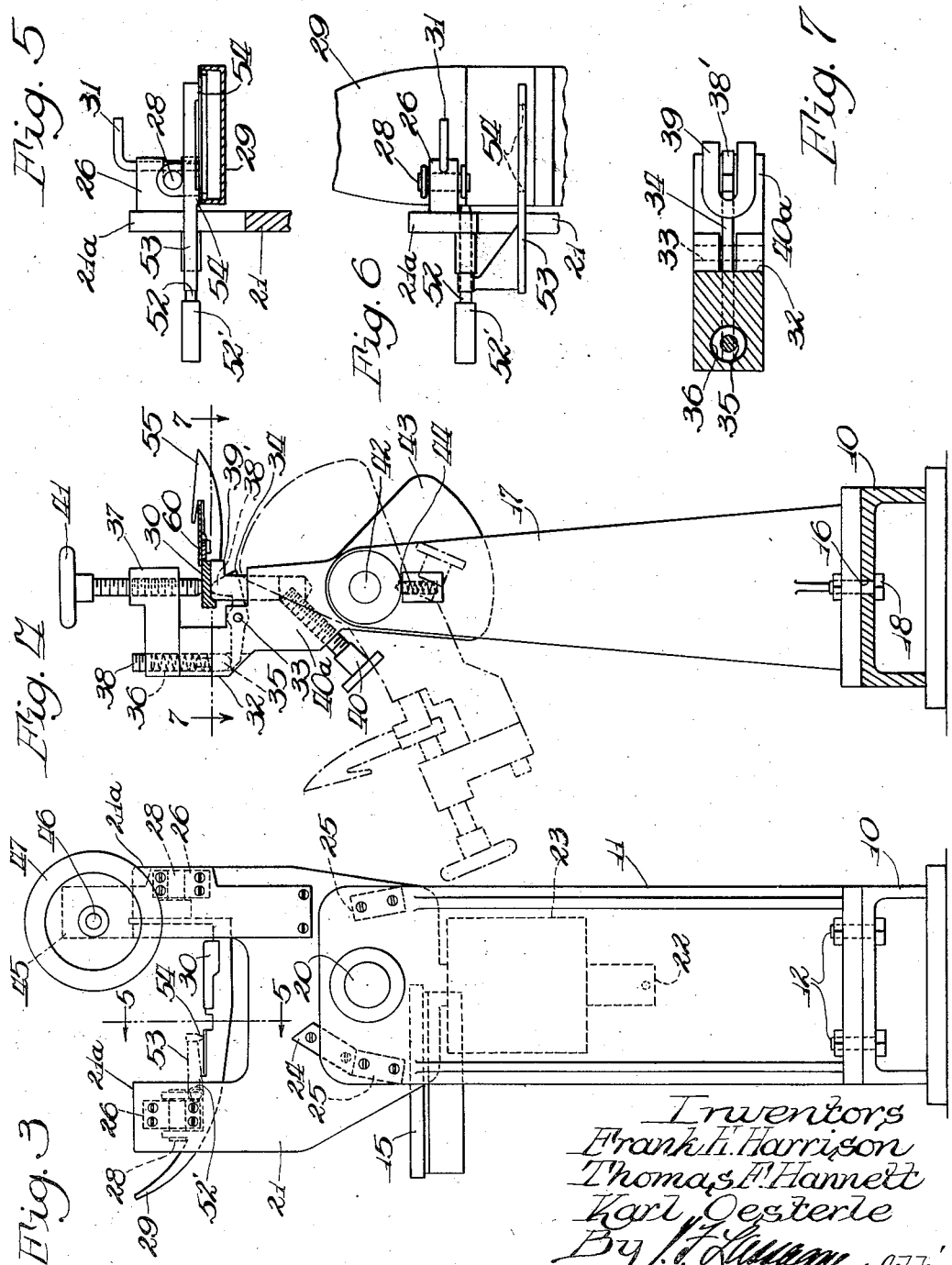

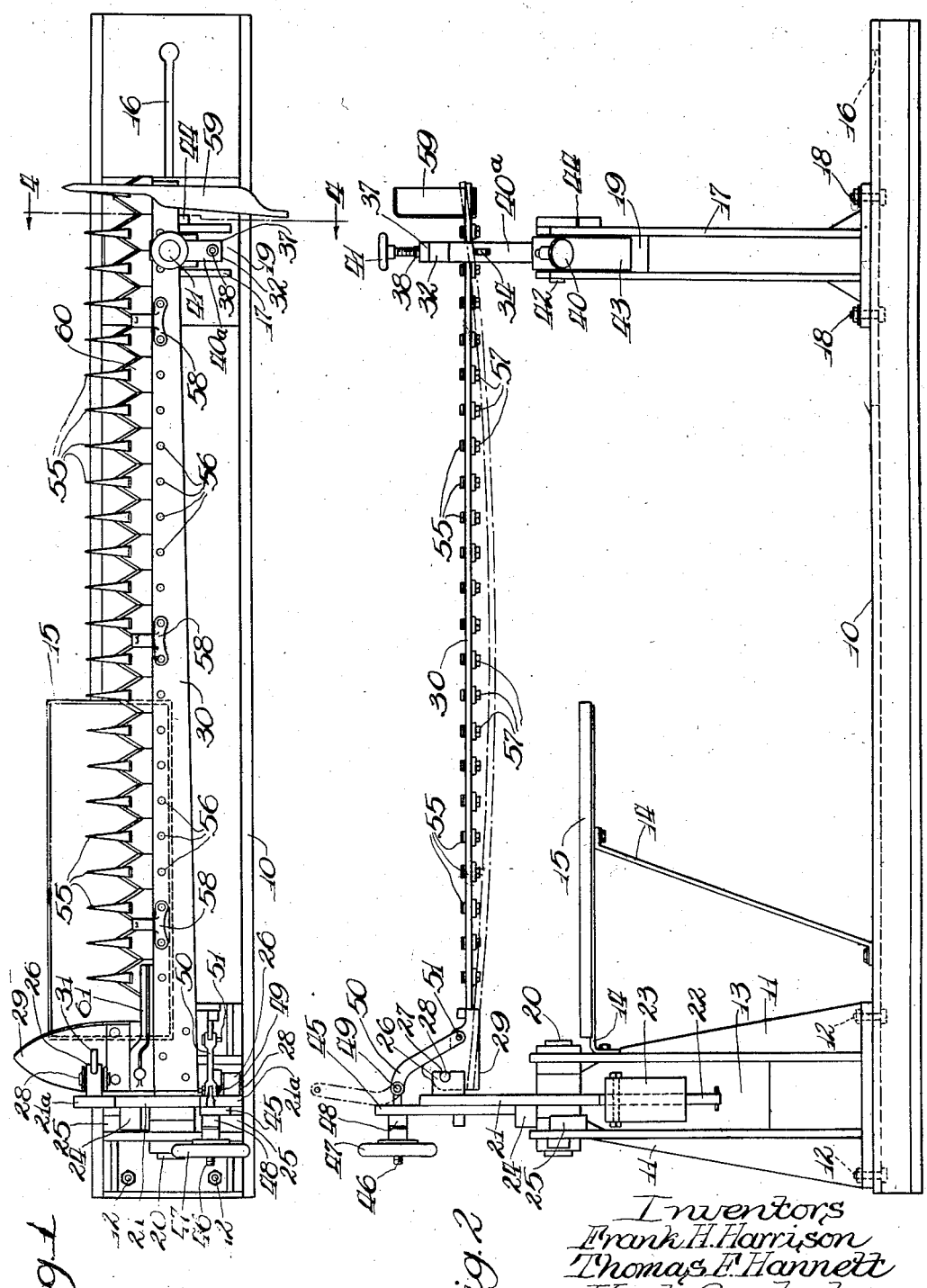

Patented Sept. 15, 1936

2,054,540

UNITED STATES PATENT OFFICE 2,054,540

ASSEMBLY FIXTURE FOR MOWER BARS

Frank H. Harrison, Chicago, Thomas F. Hannett, Berwyn, and Karl Oesterle, Chicago, Ill., assignors to International Harvester Company, a corporation of New Jersey Application March 8, 1935, Serial No. 9,922

10 Claims. (Cl. 29—89)

The invention relates to a mower bar assembling and straightening fixture to facilitate the manfacture of mower bars.

Mower bars are manufactured with a bow or curve in them from one end thereof to the other, these bars, when in use in a mower, then coming to a straight line by their own weight. This peculiarity in manufacture complicates the assembly of the guards with the bar and requires great care in straightening to insure that the knife will properly reciprocate along the bar relative to the guard fingers secured thereto.

Accordingly, it is highly desirable to provide a fixture or jig in which the bowed mower bar may be mounted and temporarily straightened to approximate or resemble the actual condition of use of the bar in a mower where, as has been said, the bar would straighten by its own weight. With the bar held in such proposed fixture, a workman may straighten any guards that may be out of line to insure proper reciprocation of the knife relative to such guards. Further, it is desirable to properly associate the mower shoe with the bar on such a fixture. Still further, it would be desirable in providing the fixture to make it convenient to work on either the top or bottom side of the bar.

The main object of the invention is to provide a shop fixture or jig which will facilitate the manufacture and assembly of mower bars, and the like, and definitely assure that a uniform, precise product will result.

Another object is to provide such a fixture by which a workman can conveniently handle the bar to straighten the guards and when fastening the same to the bar.

Other important objects of the invention will be apparent to those skilled in this art as the disclosure is more fully made.

Briefly, these important objects may be attained by the illustrative example of a practicable form of the fixture herein shown embodying a suitable base carrying a pair of uprights, or standards, one of which may be adjustable relative to the other to enable the fixture to be used for different lengths of cutter bars. One standard carries means for mounting the shoe end of the cutter bar in a manner duplicating the pivotal mounting of the shoe when the bar is associated with a mowing machine, said standard including a leveling gauge to insure proper horizontal mounting of the bar. The divider end of the bar is mounted in a clamp device of novel form.

The bar, when in the fixture, is assembled with the shoe, guards, and divider. A toggle or equivalent means is associated with the upright adjacent the shoe end of the bar, said toggle being operable to serve as the gag lever in a mower would serve, to level the bar, by which is meant to raise it to take the bow or sag out of it to straighten it as it would be used in the mower. The respective devices that hold the ends of the bar are mounted on the uprights by trunnions including counterweights, whereby the bar may be operated on by a workman from the top side, or, when pivoted around, it may be operated on from the under side. So much will suffice, it is thought, in presenting a superficial aspect of the structure, which is more particularly shown in the accompanying sheets of drawings, wherein:

Figure 1 is a general plan view of the improved assembling fixture, showing an assembled mower bar mounted therein;

Figure 2 is a rear elevational view of the structure shown in Figure 1;

Figure 3 is an end elevational view of the fixture as viewed from the left in Figure 2;

Figure 4 is a vertical sectional elevational view through the fixture, taken along the line 4—4 of Figure 1, looking in the direction of the arrows;

Figure 5 is a detail view of a gauge fixture associated with one of the clamping means, as viewed along the line 5—5 of Figure 3, looking in the direction of the arrows;

Figure 6 is a plan view of the structure shown in Figure 5; and,

Figure 7 is a detail sectional view, taken along the line 7—7 of Figure 4, looking in the direction of the arrows.

The improved fixture comprises an appropriate base member 10 carrying at one end a pair of spaced brackets 11 forming an upright secured by bolts 12 to the base 10, said upright or standard 11 being slotted or formed with a space, as at 13. Secured to one of the uprights 11 and to the base 10 by brackets 14 is a conveniently arranged horizontal table 15 where the workman carries tools and the like, which he employs when performing his duties on the mower bar.

The opposite end of the base 10 is provided with a slotted way 16, over which is arranged a second upright or pedestal 17 secured by bolts 18 to the base 10. These bolts 18, when loosened, enable the pedestal or upright 17 to be moved lengthwise of the base 10 for adjustably setting the standard 17 in a manner that will be apparent. The standard 17 is also provided with a space 19 for a purpose later to appear. The standard 17, it can now be seen, may be adjustably set on the base 10 in spaced relation to the other standard 11 for the purpose of accommodating the fixture for use in connection with mower bars of different lengths.

The pedestal 11 carries a shaft 20 in appropriate bearings at the upper end thereof, and pivotally mounted on said shaft 20 is a bracket 21 which includes a tail portion 22 on the opposite side of the pivot 20. This tail portion 22 carries an appropriate counterbalancing weight 23. On the outer face of the bracket 21 is arranged a rigidly mounted stop element 24 cooperable with either of two stop blocks 25 mounted on the adjacent upright 11 and on opposite sides of the pivot 20. From this it will be understood that the bracket 21 may be pivotally swung about the shaft 20, and that such pivotal movement is limited in opposite directions when the block 24 abuts either of the blocks 25.

The upper end of the bracket 21 is bifurcated to present two arms 21ᵃ, which on their inner faces carry ears 26 having recesses 27 aligned in fore and aft directions to receive the hinge pins 28 mounted on the shoe 29 connected to a mower bar 30. A removable pin 31 is dropped down through eyes formed in the ears 26 to latch one of the hinge pins 28 to one of the ears 26, it being understood that the other hinge pin 28 has a sliding fit with a bore formed in the other ear 26, thus making it necessary for only one latch pin 31 to be used.

The pedestal 17, as shown in Figures 2 and 7, pivotally carries on a shaft 42 a bracket 40ᵃ, which is formed at its upper end with a goose neck 32 in which is a pivot pin 33 for pivotally mounting intermediately of its ends a lever 34, one end of which is yieldingly pressed downwardly by a spring pressed plunger 35 arranged in a bore 36 formed vertically in the goose neck 32. The goose neck carries a block 37 in which is arranged a screw 38, that may be adjustably set to increase or decrease the tension of the spring associated with the plunger 35 and thus vary the pounds of pressure which it exerts on the adjacent end of the lever 34. The opposite end of the lever 34 is formed as a rest 38', on which the mower bar 30 is placed preparatory to clamping the divider end of the mower bar 30 in the fixture. The spring pressure of the spring 35 on the lever 34 is set in pounds to balance the weight of the cutter bar 30 in pounds. The rest point 38' is arranged in the bight of a U-shaped supporting plunger 39, which is mounted for up and down movement in the upper end of the bracket 40ᵃ. By means of an adjusting screw 40 conveniently located, the plunger support 39 may be raised or lowered in the upper end of the bracket 40ᵃ, as will be apparent from an inspection of Figure 4. When the bar 30 has its weight balanced on the rest point 38', the adjusting screw 40 is operated to elevate the support 39 to a position where it will engage underneath the bar 30 and carry the weight thereof. The block 37 carries a clamping screw 41, which is now turned down to clamp the bar 30 between the screw 41 and the rest and the supporting member 39. In this fashion, opposite ends of the mower bar 30 are clamped in place.

It is to be noted that the whole structure just described on the pedestal 17 is pivotally mounted on a shaft 42 and is counterbalanced by a weight 43, which includes a detent lock 44.

Going back now to the pedestal 11 and the bracket 21, it will be noted that one of the arms 21ᵃ carries an upright extension 45 in which is a screw shaft 46 carrying a hand wheel 47, said hand wheel being turnable against an abutment 48 to draw up on the threaded shaft 46, which has its inner end pivotally connected at 49 to a toggle link 50, that, in turn, is adapted to be pivotally connected at 51 to the mower shoe 29. This toggle link 50, when not connected to the shoe at 51 as just described, may be hinged back out of the way, as shown in the dotted lines in Figure 2.

As has been heretofore indicated, these mower bars are elongated and rather flexible, and, to prevent them from objectionably bowing in use in the mowing machine, it has long ago been found desirable by manufacturers to manufacture the bar with a bow in it opposite to the bow which it would tend to have in use in the mowing machine. Thus, when such a bar, manufactured with a bow in it, is in use on the ground in a mowing machine, it will of its own weight tend to straighten out and operate in a true horizontal position, which, of course, is the proper way for the mower bar to operate, if it is to function efficiently. In Figure 2, in the dotted lines, there is shown the mower bar with this preformed bow in it. After the opposite ends of the bar have been clamped on the respective clamping devices already described, the workman rotates the hand-wheel 47 to draw on the threaded shaft or rod 46, to exert a pull on the toggle link 50, to strain the bar 30 in an upward direction whereby to remove the bow, or, in other words, to straighten the bar. The toggle link 50, in effect, performs the same function in this fixture that the usual gag lever performs in a mowing machine, to hold the cutter bar straight and take the sag out of it.

Associated with one of the arms 21ᵃ on the bracket 21 is a laterally extended pivot shaft 52 having an operating handle 52', which shaft has integrally formed therewith a laterally extending arm 53 having two feeler surfaces 54 to engage the upper surface of the cutter bar 30 adjacent the shoe 29. By this means the bar 30 can be positively leveled before it is clamped. These feelers 54 are merely contact-surfaces and when they lie flush on the top surface of the bar 30 without daylight showing between the surfaces, the operator knows that the bar 30 is absolutely level and he then proceeds with the clamping of the ends of the bar 30 in the fixture.

The bar carries a plurality of guard fingers 55 at spaced intervals therealong, said guard fingers being fastened to the bar in the usual way by bolts 56 with fastening nuts 57 threaded thereonto underneath the bar 30. Knife clips 58 are also secured at intervals along the upper side of the bar 30, as shown in Figure 1. At the right hand end of the bar 30, outwardly of the support 17, the bar carries the usual divider 59 and after the bar has been completely straightened and all guard fingers have been properly positioned, the usual reciprocatory knife 60 having a knife head 61 may be slid in under the lips of the guards 55 from the left hand or shoe end of the machine to enable the operator to reciprocate the knife back and forth between the guards to make sure that it will run freely.

In use and operation, the cutter bar 30, having affixed thereto the guards 55, the shoe 29, and the divider 59, is brought into position by an operator to be clamped at its respective ends in the fixture. The left hand or shoe end of the bar is secured to the fixture by placing the hinge pins 28 of the shoe 29 in the ears 26, one of said ears being closed by the removable latch pin 31 whereby the left hand end of the cutter bar will now be securely held on the bracket 21 associated with the upright 11. The bracket 40ª on the other upright 17 has its lever 34 properly pressed by the spring 35, so that the rest point 38' of the said lever will just carry in balance the weight of the cutter bar 30. The plunger support 39, as has been stated, will be in its lowered position, and, after the bar 30 properly rests on the rest point 38', the screw 40 is operated to move the plunger support 39 upwardly against the under side of the cutter bar 30.

The operator then actuates the screw 41 to clamp the bar between the screw 41 and the support 39. Next, the operator turns the hand wheel 47 in the manner described to draw on the toggle link 50 to spring the cutter bar 30 upwardly to straighten the same by removing the preformed bow therein, as indicated in Figure 2. While this is being done, the operator may manipulate the shaft 52 to set the feeler points 54 with respect to the top surface of the shoe end of the bar 30, and by this means he can definitely ascertain that the bar is absolutely in a true horizontal level position. When this position of the bar has been attained, the operator can hammer all guards 55, which may have become misshapen to properly align them to enable free passage therethrough of the reciprocatory sickle 60.

During this hammering operation, some of the nuts 57 may have become loosened and, as they are on the under side of the bar, it would be awkward to get at them for tightening from the bottom, and so the operator can hinge the brackets 21 and 40ª about their respective transversely aligned pivots 20 and 42 to move these brackets and the cutter bar assembly from the full line position shown in Figure 4 to the dotted line position shown in said figure. These movements make the nuts 57 easily accessible for the application of a wrench to tighten them. Further, in this tilted position of the fixture, it is easy for the workman to hammer the guards from the bottom, if he so desires, in the process of straightening them. The counterweights 23 and 43 balance the mechanism in such a manner that the whole fixture is easily pivoted as has been described, the detent 44 serving releasably to lock the fixture in its up position, the tilting movement of the fixture being limited by the stop 24 when it engages either of the abutment blocks 25.

So long as bars of the same weight are being assembled and straightened by this fixture, the support plunger 39 remains in the position shown in the full lines of Figure 4. If it is desired to operate on bars of other lengths and weights, then the plunger support 39 must be lowered and the pounds of pressure imparted by the spring 35 on the lever 34 must be adjusted, so that, when the different sized bar is mounted on the rest point 38', it will be in proper balance. The point is that for a given size and weight of bar 30 the support 39 does not have to have its position altered. Further, if longer or shorter bars than the ones shown in the drawings are to be operated upon, the one pedestal 17 may be adjustably placed along the base 10 to accommodate the apparatus for such different lengths of bars. When the bar has been properly straightened and its guards have been lined up so that the sickle will properly work in the mechanism, the assembled cutter bar structure is removed from the apparatus by simply unloosening the various clamping devices heretofore described.

From this description it will now be appreciated that an assembling fixture for mower bars has been provided which enables the factory workman to assemble mower bars with their associated parts in the same position and condition as when the cutter bar is to be used in a mowing machine in the field, and from this fact it is obvious that a precise, uniform product will result, which will overcome many of the field difficulties encountered in the operation of mower bars.

It is the intention to cover all such changes and modifications of the illustrated form of the invention herein chosen for purposes of disclosure which do not depart from the spirit and scope of the invention which has been defined in the following claims.

What is claimed is:

1. In a fixture of the class described comprising a pair of standards, a counter-weighted bracket pivotally carried on each standard, one of said brackets having means for detachably and pivotally supporting a shoe connected with a mower bar, means associated with the other bracket to clamp the divider end of the mower bar, and means for straightening the bar while it is held by said supporting and clamping means.

2. In a fixture of the class described comprising a pair of standards, means on each standard for supporting opposite ends of a mower bar with its shoe, and lift link means associated with one of the standards and connectible with the shoe at a point between the standards for straightening the bar.

3. In a fixture of the class described for operating on mower bars having a shoe and divider respectively connected to opposite ends thereof, said fixture comprising a pair of standards, means associated with one of the standards for pivotal connection with the shoe to support one end of the bar, means associated with the other standard for clamping the opposite end of the bar in level position, and means associated with one of the standards for straightening the bar to a horizontal position.

4. In a fixture of the class described for operating on mower bars having a shoe and divider respectively connected to opposite ends thereof, said fixture comprising a pair of standards, one of which is relatively adjustable with respect to the other to vary the spacing of said standards, means associated with one of the standards for pivotal connection with the shoe to support one end of the bar, means associated with the other standard for holding the opposite end of the bar in level position, and manually operable means associated with the standard adjacent the shoe to hinge the shoe whereby the bar may be straightened to a level horizontal position.

5. In a fixture of the class described for operating on mower bars having a shoe and divider respectively connected to opposite ends thereof, said fixture comprising a pair of standards, a rockably mounted bracket associated with one of the standards having means for detachable and pivotal connection with the shoe to support one end of the bar, a rockably mounted bracket associated with the other standard having means for detachably holding the opposite end of the bar, and means associated with the first mentioned bracket connectible with the shoe for exerting a force to straighten the bar to a straight line position.

6. In a fixture of the class described for operating on mower bars having a shoe and divider respectively connected to opposite ends thereof, said fixture comprising a pair of standards, a rockably mounted bracket associated with one of the standards having means for detachable and pivotal connection with the shoe to support one end of the bar, a rockably mounted bracket associated with the other standard having means for detachably holding the opposite end of the bar, means for limiting the rocking movement of the brackets in opposite directions, and manually operable means carried by one of the brackets for exerting a force on the bar to straighten the same.

7. In a fixture of the class described for operating on mower bars having a shoe at one end, said fixture comprising a pair of standards, means on one of the standards adapted hingedly to connect with the shoe for supporting one end of the bar, a feeler gauge associated with said standard for assisting leveling of the bar, a spring pressed adjustable balance device to carry the weight of the bar at the other standard, means at said last mentioned standard to support and clamp the end of the bar opposite from its shoe end, and means associated with one of the standards to exert a force to straighten the bar to a horizontal position.

8. In a fixture of the class described for operating on mower bars having a shoe at one end, said fixture comprising a pair of standards, means on one of the standards adapted hingedly to connect with the shoe for supporting one end of the bar, a spring pressed adjustable balance device to carry the weight of the bar at the other standard, an adjustable support to carry the bar adjacent the balance device, a clamp cooperable with the support to hold said end of the bar, and means connectible with the shoe and associated with the proximate standard to exert a force to straighten the bar to a horizontal position.

9. A mower bar assembly fixture comprising a base, a pair of upright supports carried on the base in spaced relation, one support being adjustably mounted on the base to vary the relative spacing of the supports, each support having an upper bifurcated end, a shaft journaled in each bifurcated end with the axes of the shafts disposed in substantial horizontal alinement, a fixture located within each bifurcated end and mounted for turning movement on the respective shafts, said fixtures including clamp devices for clamping opposite ends of a harvester cutter-bar, said fixtures including counterweight extensions swingable through the bifurcated ends when the fixtures are swung on their axes to move the cutter-bar from its normal horizontal position to an inverted tilted position exposing its bottom side.

10. A mower bar assembling and straightening fixture comprising clamps for holding the ends of a cutter-bar in a manner supporting the bar substantially horizontally in mid-air whereby sag exists in the bar between its ends, and adjusting means operatively associated with the fixture and including a connection with the bar at a point spaced from the clamps for exerting a force to spring the bar to a level position.

FRANK H. HARRISON.
THOMAS F. HANNETT.
KARL OESTERLE.